United States Patent
Roddy et al.

(10) Patent No.: US 7,199,086 B1
(45) Date of Patent: *Apr. 3, 2007

(54) SETTABLE SPOTTING COMPOSITIONS COMPRISING CEMENT KILN DUST

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/271,431

(22) Filed: Nov. 10, 2005

(51) Int. Cl.
*C09K 8/467* (2006.01)
*E21B 33/13* (2006.01)
*C04B 40/00* (2006.01)

(52) U.S. Cl. ...................... 507/269; 106/707; 106/819; 166/292; 166/293

(58) Field of Classification Search ................. 507/269
See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,871,133 A | 1/1959 | Palonen et al. |
| 2,945,769 A | 7/1960 | Gama et al. |
| 3,454,095 A * | 7/1969 | Webster et al. ............. 166/303 |
| 3,748,159 A | 7/1973 | George |
| 3,887,385 A | 6/1975 | Quist et al. |
| 4,018,617 A | 4/1977 | Nicholson |
| 4,031,184 A | 6/1977 | McCord |
| 4,268,316 A | 5/1981 | Wills, Jr. |
| 4,341,562 A | 7/1982 | Ahlbeck |
| RE31,190 E | 3/1983 | Detroit et al. |
| 4,407,677 A | 10/1983 | Wills, Jr. |
| 4,432,800 A | 2/1984 | Kneller et al. |
| 4,435,216 A | 3/1984 | Diehl et al. |
| 4,460,292 A | 7/1984 | Durham et al. |
| 4,515,635 A | 5/1985 | Rao et al. |
| 4,555,269 A | 11/1985 | Rao et al. |
| 4,614,599 A | 9/1986 | Walker |
| 4,676,317 A | 6/1987 | Fry et al. |
| 4,741,782 A | 5/1988 | Styron |
| 4,784,223 A | 11/1988 | Worrall et al. |
| 4,941,536 A | 7/1990 | Brothers et al. |
| 4,992,102 A | 2/1991 | Barbour |
| 5,049,288 A | 9/1991 | Brothers et al. |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,238,064 A | 8/1993 | Dahl et al. |
| 5,266,111 A | 11/1993 | Barbour et al. |
| 5,295,543 A | 3/1994 | Terry et al. |
| 5,314,022 A | 5/1994 | Cowan et al. |
| 5,327,968 A | 7/1994 | Onan et al. |
| 5,337,824 A | 8/1994 | Cowan |
| 5,358,044 A | 10/1994 | Hale et al. |
| 5,368,103 A | 11/1994 | Heathman et al. |
| 5,382,290 A | 1/1995 | Nahm et al. |
| 5,383,521 A | 1/1995 | Onan et al. |
| 5,383,967 A | 1/1995 | Chase |
| 5,458,195 A | 10/1995 | Totten et al. |
| 5,472,051 A | 12/1995 | Brothers |
| 5,494,513 A | 2/1996 | Fu et al. |
| 5,518,996 A | 5/1996 | Maroy et al. |
| 5,520,730 A | 5/1996 | Barbour et al. |
| 5,529,624 A | 6/1996 | Riegler |
| 5,536,311 A | 7/1996 | Rodrigues |
| 5,569,324 A | 10/1996 | Totten et al. |
| 5,585,333 A | 12/1996 | Dahl et al. |
| 5,588,489 A | 12/1996 | Chatterji et al. |
| 5,711,383 A | 1/1998 | Terry et al. |
| 5,716,910 A | 2/1998 | Totten et al. |
| 5,728,654 A | 3/1998 | Dobson, Jr. et al. |
| 5,851,960 A | 12/1998 | Totten et al. |

(Continued)

FOREIGN PATENT DOCUMENTS

| | | |
|---|---|---|
| CA | 2153372 | 9/1996 |
| GB | 1469954 | 4/1977 |
| JP | 52117316 A | 1/1977 |
| JP | 10110487 | 4/1998 |
| SU | 1373781 | 2/1988 |
| WO | WO 83/01443 | 4/1983 |
| WO | WO 98/54108 | 12/1998 |
| WO | WO 03/031364 A1 | 4/2003 |

OTHER PUBLICATIONS

Halliburton brochure entitled "Halad®-23 Fluid-Loss Additive" dated 2000.
Halliburton brochure entitled "Halad®-344 Fluid Loss Additive" dated 1998.
Halliburton brochure entitled "Halad®-413 Fluid-Loss Additive" dated 1998.
Halliburton brochure entitled "HR®-4 Cement Retarder" dated 1999.
Halliburton brochure entitled "HR®-5 Cement Additive" dated 1998.

(Continued)

*Primary Examiner*—Randy Gulakowski
*Assistant Examiner*—Timothy J. Kugel
(74) *Attorney, Agent, or Firm*—Craig W. Roddy; Fletcher Yoder

(57) ABSTRACT

Provided herein are settable spotting compositions that comprise cement kiln dust and associated methods of use. Also provided are methods that comprise providing a settable spotting composition comprising cement kiln dust; introducing the settable spotting composition into a well bore that penetrates the subterranean formation so as to displace at least a portion of a second fluid from the well bore.

25 Claims, No Drawings

U.S. PATENT DOCUMENTS

| | | |
|---|---|---|
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,508,305 B1 | 1/2003 | Brannon et al. |
| 6,524,384 B2 | 2/2003 | Grif |
| 6,547,871 B2 | 4/2003 | Chatterji et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,610,139 B2 | 8/2003 | Reddy et al. |
| 6,626,243 B1 | 9/2003 | Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,077,203 B1 * | 7/2006 | Roddy et al. ............... 166/293 |
| 2002/0033121 A1 | 3/2002 | Marko |
| 2002/0073897 A1 | 6/2002 | Trato ........................ 106/638 |
| 2002/0117090 A1 | 8/2002 | Ku |
| 2003/0116887 A1 | 6/2003 | Scott |
| 2003/0167970 A1 | 9/2003 | Polson |
| 2004/0007162 A1 | 1/2004 | Morioka et al. |
| 2004/0040475 A1 | 3/2004 | Roij |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0187740 A1 | 9/2004 | Timmons |
| 2004/0188091 A1 | 9/2004 | Luke et al. |
| 2004/0188092 A1 | 9/2004 | Santra et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2005/0000734 A1 | 1/2005 | Getzlaf et al. |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2006/0025312 A1 | 2/2006 | Santra et al. |
| 2006/0162926 A1 | 7/2006 | Roddy ........................ 166/278 |

OTHER PUBLICATIONS

Halliburton brochure entitled "HR®-7 Cement Retarder" dated 1999.
Halliburton brochure entitled HR®-12 Cement Retarder dated 1999.
Halliburton brochure entitled HR®-15 Cement Retarder dated 1999.
Halliburton brochure entitled "HR®-25 Cement Retarder" dated 1999.
Halliburton brochure entitled "SCR-100 Cement Retarder" dated 1999.
Halliburton brochure entitled "SCR-100 Cement Retarder—A Valuable Time Saver" dated 1994.
Halliburton brochure entitled "SCR-500L™ High-Temperature Retarder" dated 2000.
Halliburton brochure entitled "ACF-2 Foaming Agent" dated 1999.
Halliburton brochure entitled "Howco-Suds Surfactant" dated 1999.
Halliburton brochure entitled "Halad®413 Fluid-Loss Additive" dated 1999.
Halliburton brochure entitled "Pozmix® A Cement Additive" dated 1999.
Halliburton brochure entitled "Pozmix Cement & Pozmix 140" undated.
University of Maine, "Beneficial Use of Solid Waste in Maine" printed from the internet Apr. 14, 2005.
Smith, Dwight K., "Cementing" dated 1980, p. 38.
Parsons, R.L. et al., "Use of Cement Kiln Dust for the Stabilization of Soils" printed from the internet on Apr. 14, 2005.
Paper entitled "Kiln Dusts" printed from the internet on Apr. 14, 2005.
Paper entitled "Standards for the Management of Cement Kiln Dust Waste" printed from the internet Apr. 14, 2005.
Sersale, R. et al., "Portland-Zeolite-Cement For Minimizing Alkali-Aggregate Expansion" dated 1987.
Marfil, S.A. et al., "Zeolite Crystallization in Portland Cement Concrete Due to Alkali-Aggregate Reaction" dated 1993.
Janotka, I., "The Properties of Mortar Using Blends With Portland Cement Clinker, Zeolite Tuff and Gypsum" dated 1995.
Atkins, M. et al., "Zeolite P in Cements" Its Potential For Immobilizing Toxic and Radioactive Waste Species dated 1995.
Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.
Naiqian, Feng et al., "Study on the suppression effect of natural zeolite on expansion of concrete due to alkali-aggregate reaction" dated 1998.
Chan, Sammy et al., "Comparative study of the initial surface absorption and chloride diffusion of high performance zeolite, silica fume and PFA concretes" dated 1999.
Ding, Jian-Tong et al., "Extreme vertices design of concrete with combined mineral admixtures" dated 1999.
Poon, C.S. et al., "A study on the hydration of natural zeolite blended cement pastes" dated 1999.

Feng, N.-Q et al., "Zeolite ceramiste cellular concrete" dated 2000.
Bartlet-Gouedard, V. et al., "A Non-Conventional Way of Developing Cement Slurry for Geothermal Wells" dated 2001.
Office action from U.S. Appl. No. 11/223,671 dated Mar. 31, 2006.
Office action from U.S. Appl. No. 11/223,671, dated Dec. 15, 2005.
Roddy, C. et al., "Methods of Using Settable Compositions Comprising Cement Kiln Dust" U.S. Appl. No. 11/223,671 filed Sep. 9, 2005.
Roddy, C. et al., "Methods of Using Foamed Settable Compositions Comprising Cement Kiln Dust" U.S. Appl. No. 11/223,485, filed Sep. 9, 2005.
Roddy, C. et al., "Foamed Settable Compositions Comprising Cement Kiln Dust," U.S. Appl. No. 11/223,703, filed Sep. 9, 2005.
Roddy, C. et al., "Methods of Using Settable Compositions Comprising Cement Kiln Dust and Additive(s)" U.S. Appl. No. 11/223,750, filed Sep. 9, 2005.
Roddy, C. et al., "Settable Compositions Comprising Cement Kiln Dust and Additive(s)" U.S. Appl. No. 11/223,669, filed Sep. 9, 2005.
Roddy, C. et al., "Methods of Using Cement Compositions Comprising High Alumina Cement and Cement Kiln Dust" U.S. Appl. No. 11/257,261, filed Oct. 24, 2005.
Roddy C. et al., "Cement Compositions Comprising High Alumina Cement and Cement Kiln Dust" U.S. Appl. No. 11/256,824, filed Oct. 24, 2005.

Roddy, C. et al., "Methods of Using Settable Compositions Comprising Cement Kiln Dust" U.S. Appl. No. 11/271,690, filed Nov. 10, 2005.
Smith, Dwight, "Cementing", Society of Petroleum Engineers, 1987, pp. 14, 38.
Roddy, C. et al., "Settable Spotting Compositions Comprising Cement Kiln Dust" U.S. Appl. No. 11/271,431, filed Nov. 10, 2005.
Roddy, C. et al., "Methods of Using Lightweight Settable Compositions Comprising Cement Kiln Dust" U.S. Appl. No. 11/416,563 filed May 3, 2006.
Roddy, C. et al., "Lightweight Settable Compositions Comprising Cement Kiln Dust" U.S. Appl. No. 11/416,754 filed May 3, 2006.
Roddy, C. et al., "Methods of Using Settable Compositions Comprising Cement Kiln Dust" U.S. Appl. No. 11/440,627 filed May 25, 2006.
Herndon, J. et al., "Setting Downhole Plugs: A State-of-the-Art" Petroleum Engineer International, Apr. 1978.
txi® Material Safety Data Sheet for PRESSUR-SEAL.
Office action dated Jul. 24, 2006 from U.S. Appl. No. 11/403,032.
Office action dated Jul. 21, 2006 from U.S. Appl. No. 11/416,563.
Office action dated Aug. 21, 2006 from U.S. Appl. No. 11/440,627.
Office action date Oct. 19, 2006 from U.S. Appl. No. 11/402,741.

* cited by examiner

SETTABLE SPOTTING COMPOSITIONS COMPRISING CEMENT KILN DUST

BACKGROUND

The present invention relates to subterranean operations and, more particularly, to settable spotting compositions comprising cement kiln dust ("CKD"), and associated methods of use in subterranean operations.

During the drilling of a well bore in a subterranean formation, a drilling fluid may be used to, among other things, cool the drill bit, lubricate the rotating drill string to prevent it from sticking to the walls of the well bore, prevent blowouts by serving as a hydrostatic head to counteract the sudden entrance into the well bore of high pressure formation fluids, and remove drill cuttings from the well bore. A drilling fluid may be circulated downwardly through a drill pipe and drill bit and then upwardly through the well bore to the surface. The drilling fluid used may be any number of fluids (gaseous or liquid) and mixtures of fluids and solids (such as solid suspensions, mixtures, and emulsions).

Once the well bore has been drilled to a desired depth, the drill string and drill bit may be removed from the well bore and the drilling fluid may be left in the well bore to provide hydrostatic pressure on the formation penetrated by the well bore, e.g., to prevent the flow of formation fluids into the well bore. Next, a pipe string (e.g., casing, liners, etc.) may be introduced into the well bore. Depending on the depth of the well bore and whether or not any problems are encountered in introducing the pipe string into the well bore, the drilling fluid may remain relatively static in the well bore for a relatively long time period, for example, up to about 2 weeks or longer. While drilling fluids are generally not settable (e.g., they generally do not to form a hardened mass over time), drilling fluids may increase in gel strength over time. As referred to herein, "gel strength" is the measure of the ability of a colloidal dispersion to form a gel and is based upon its resistance to shear. Accordingly, during the time period that the drilling fluid is static in the well bore, portions of the drilling fluid may increase in gel strength so that displacement of the drilling fluid from within the well bore may be become more difficult.

After the pipe string has been introduced into the well bore, the pipe string may be cemented in the well bore by pumping a cement composition into an annular space between the walls of the well bore and the pipe string disposed therein, thereby displacing the drilling fluid in the annulus. However, if the drilling fluid has developed sufficient gel strength due to remaining static in the well bore, portions of the drilling fluid in the annulus may not be displaced. Since the drilling fluid generally is not settable, this may be problematic, among other reasons, because it may lead to the loss of zonal isolation, which can result in formation fluids continuing to enter and flow in the well bore due to the portions of the drilling fluid remaining therein.

Heretofore, settable spotting compositions have been used in the displacement of drilling fluids from well bores. As referred to herein, the term "settable spotting composition" refers to a fluid which over time sets to form a hardened mass, but will not set for a desired period of time, for example, from about 1 day to at least 2 weeks. In some instances, settable spotting compositions may be used to displace the drilling fluid from the well bore prior to the drilling fluid having gained a significant amount of gel strength, for example, prior to introducing the pipe string into the well bore. Generally, these settable spotting compositions should not have an undesirable increase in gel strength after being static in the well bore a period of time, for example, up to at least two weeks, so that the settable spotting compositions may be displaced from the well bore. After the well bore is at least partially filled with the settable spotting composition, the pipe string to be cemented may be introduced into the well bore. When the cement composition is pumped through the pipe string into the annulus, the drilling fluid (if any) and settable spotting composition in the pipe string and annulus should be displaced ahead of the cement composition. The settable spotting composition, if any, remaining in fractures or other permeable portions of the subterranean formation should set into a hardened mass, thereby preventing or reducing the entry or flow of formation fluids in the annulus.

Settable spotting compositions used heretofore, in some instances, have comprised blast furnace slag and other hydraulic components. To prevent a slag-containing settable spotting composition from prematurely setting, a very strong set retarder may be included therein and the settable spotting composition should be separated from the cement composition by a spacer fluid. If intermixing between the cement composition and the set retarded settable spotting composition occurs, the cement composition may be prevented from setting by the strong set retarder in the settable spotting composition. Another settable spotting composition that has been used, in some instances, to displace drilling fluids from well bores includes compositions that comprise water, fly ash, a gel strength inhibiting additive, and a set retarding additive. "Fly ash," as that term is used herein, refers to the residue from the combustion of powdered or ground coal, wherein the fly ash carried by the flue gases may be recovered, for example, by electrostatic precipitation. Class F fly ash generally does not contain sufficient lime, so an additional source of calcium ions is required for the Class F fly ash to form a settable spotting composition with water.

Oil-based settable spotting compositions have also been used heretofore in the displacement of drilling fluids from well bores. For instance, a conventional settable spotting composition comprises an oil-external emulsion that comprises oil, water, an emulsifying surfactant, a hydraulically settable component, and optionally a demulsifying surfactant. Generally, the demulsifying surfactant may be included in the spotting compositions for demulsifying the oil-external emulsion when contacted by external water. The hydraulically settable component should be present in the oil phase of the oil-external emulsion to delay the setting of the settable spotting composition until after the demulsification of the oil-external emulsion.

During the manufacture of cement, a waste material commonly referred to as "CKD" is generated. "CKD," as that term is used herein, refers to a partially calcined kiln feed that is removed from the gas stream and collected during the manufacture of cement. Usually, large quantities of CKD are collected in the production of cement, and they are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, $CaO$, $MgO$, $SO_3$, $Na_2O$, and $K_2O$.

SUMMARY

The present invention relates to subterranean operations and, more particularly, to settable spotting compositions comprising CKD, and associated methods of use in subterranean operations.

In one embodiment, the present invention provides a settable spotting composition that comprises CKD.

Another embodiment of the present invention provides a settable spotting composition that comprises an oil external emulsion comprising oil, water, CKD, an emulsifying surfactant, and a set retarding additive.

Another embodiment of the present invention provides a settable spotting composition that comprises water, CKD, and a set retarding additive.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to subterranean operations and, more particularly, to settable spotting compositions comprising CKD, and associated methods of use in subterranean operations.

The settable spotting compositions of the present invention comprise CKD. The settable spotting compositions of the present invention should set over time to form a hardened mass, but should not for a desired period of time, for example, from about 1 day to at least 2 weeks. Nor should these settable spotting compositions have an undesirable increase in gel strength after being static in the well bore a period of time, for example, up to at least two weeks, so that the settable spotting compositions may be displaced from the well bore. Generally, the settable spotting compositions may be oil-based or water-based. In the oil-based embodiments, the settable spotting compositions of the present invention may comprise an oil-external emulsion that comprises oil, water, CKD, a set retarding additive, and an emulsifying surfactant. In the water-based embodiments, the settable spotting compositions of the present invention may comprise water, CKD, and a set retarding additive.

I. Oil-Based Embodiments

As previously discussed, in some embodiments, the settable spotting compositions of the present invention may be oil-based. In these oil-based embodiments the settable spotting compositions of the present invention may comprise an oil-external emulsion that comprises oil, water, CKD, a set retarding additive, and an emulsifying surfactant. In some embodiments, the settable spotting compositions further may comprise a demulsifying surfactant. Those of ordinary skill in the art will recognize that these oil-external emulsions should have a continuous oil phase and a discontinuous water phase. The oil-based settable spotting compositions of the present invention should set over time to form a hardened mass, but should not for a desired period of time, for example, from about 1 day to at least 2 weeks. Nor should these settable spotting compositions have an undesirable increase in gel strength after being static in the well bore for a period of time, for example, up to at least two weeks, so that the settable spotting compositions may be displaced from the well bore. In some embodiments, upon subsequent contact with external water, for example, from a subsequently introduced cement composition or formation fluid, the oil-external emulsion should demulsify so that the hydraulic cement and the CKD mix with the water thereby facilitating the setting of the settable spotting composition.

Suitable oils that may be included in the oil-based settable spotting compositions of the present invention include, but are not limited to, diesel oil, internal olefins, mineral oil, vegetable oils, long chain esters, and combinations thereof. An example of a long chain mineral oil is ESCAID™ 110 oil from Exxon Mobil Corporation, Houston, Tex. In some embodiments, the oil may be present in the settable spotting compositions of the present invention in an amount in the range of from about 50% to about 90% by volume of the settable spotting composition. In some embodiments, the oil may be present in the settable spotting compositions of the present invention in an amount in the range of from about 60% to about 80% by volume of the settable spotting composition.

The water used in the oil-based settable spotting compositions of the present invention may be freshwater, saltwater (e.g., water containing one or more salts dissolved therein), brine (e.g., saturated saltwater produced from subterranean formations), or seawater, or combinations thereof. Generally, the water may be from any source, provided that it does not contain an excess of compounds that may adversely affect other components in the cement composition. In some embodiments, the water may be present in the settable spotting compositions of the present invention in an amount in the range of from about 5% to about 45% by volume of the settable spotting composition. In some embodiments, the water may be present in the settable spotting compositions of the present invention in an amount in the range of from about 20% to about 40% by volume of the settable spotting composition.

The CKD included in the oil-based settable spotting compositions of the present invention may include CKD classified as Class A, C, H, and G according to the American Petroleum Institute, *API Specification for Materials and Testing for Well Cements*, API Specification 10, Fifth Ed., Jul. 1, 1990. Generally, the CKD should be present in the oil phase of the oil-external emulsion. Further, the CKD should be included in the settable spotting compositions in an amount sufficient to provide the desired compressive strength, density, and/or cost reduction. In some embodiments, the CKD may be present in the settable spotting compositions of the present invention in an amount in the range of from about 0.01% to 100% by weight. As used herein, the term "by weight," when used herein to refer to the percent of a component in the settable spotting composition, means by weight included in the settable spotting compositions of the present invention relative to the weight of the dry components in the settable spotting composition. In some embodiments, the CKD may be present in the settable spotting compositions of the present invention in an amount in the range of from about 5% to 100% by weight. In some embodiments, the CKD may be present in the settable spotting compositions of the present invention in an amount in the range of from about 5% to about 80% by weight. In some embodiments, the CKD may be present in the settable spotting compositions of the present invention in an amount in the range of from about 10% to about 50% by weight.

The oil-based settable spotting compositions further comprise a set retarding additive. As used herein, the term "set retarding additive" refers to an additive that retards the setting of the settable spotting compositions of the present composition. Examples of suitable set retarding additives include, but are not limited to, ammonium, alkali metals, alkaline earth metals, metal salts of sulfoalkylated lignins, water-soluble hydroxycarboxyacid, synthetic copolymers, phosphonic acid derivatives, boric acid derivatives, and combinations thereof. An example of a suitable water-soluble hydroxycarboxyacid is HR®-25 retarder, from Halliburton Energy Services, Inc., Duncan, Okla. One example of a suitable sulfoalkylate lignin comprises a sulfomethylated lignin. Examples of suitable synthetic copolymer retarders are SCR®-100 retarder and SCR®-500 retarder, from Halliburton Energy Services, Inc., Duncan, Okla. The synthetic copolymer retarders may be used in the acid form and/or the salt form. Suitable set retarding additives are disclosed in more detail in U.S. Pat. No. Re. 31,190, the relevant disclosure of which is incorporated herein by reference. The set retarding additive should be included in the settable spotting compositions of the present invention in an amount sufficient to provide the desired set retardation. In some embodiments, the set retarding additive may be present in a settable spotting composition of the present invention in an amount in the range of from about 0.1% to about 5% by weight.

Emulsifying surfactants are also present in the oil-based settable spotting compositions of the present invention, among other things, for emulsifying the oil with the water to form the oil-external emulsion. The emulsifying surfactants included in the settable spotting compositions of the present invention may be any surfactant suitable for providing the desired oil-external emulsion. Examples of suitable emulsifying surfactants include, but are not limited to, tall oil diethanolamides, a mixture of oxidized tall oil fatty acids, alkylphenol hydroxypolyoxyethylene, and combinations thereof. An example of a suitable emulsifying surfactant comprises a tall oil diethanolamide of the formula RCON$(CH_2CH_2OH)_2$, wherein R is a $C_{18}$ to $C_{20}$ alkyl radical which is commercially available as AMIDEX® alkanolamide from Chemron Corporation, Paso Robles, Calif. Another example of a suitable emulsifying surfactant comprises a mixture of oxidized tall oil fatty acids, that is commercially available as OTO MOD #4™ emulsifier from Expo Chemical Co. Inc., Houston, Tex.

Generally, the emulsifying surfactants should be included in the oil-based settable spotting compositions in an amount sufficient to provide the desired oil external emulsion. In some embodiments, the emulsifying surfactant may be present in the settable spotting composition in an amount in the range of from about 5% to about 15% by weight. In some embodiments, the emulsifying surfactant may be present in the settable spotting composition in an amount in the range of from about 5% to about 12% by weight.

Optionally, demulsifying surfactants may also be included in the oil-based settable spotting compositions of the present invention, among other things, to destabilize the oil-external emulsion at the desired time. Any demulsifying surfactant may be used that is capable of providing the desired demulsification of the oil-external emulsion. Examples of suitable demulsifying surfactants include, but are not limited to, ethoxylated nonylphenols, quaternized triethanolamine condensate polymers, triethanolamine condensate polymers, ethoxlyated alkyl alcohol glycol ethers, and combinations thereof. In certain embodiments, the ethoxylated alkyl alcohol glycol ethers may be ethoxylated with from about 3 to about 10 moles of ethylene oxide. In certain embodiments, the ethoxylated alkyl alcohol glycol ethers may have from about 12 to about 16 carbon atoms in the alkyl alcohol. An example of a suitable ethoxlyated alkyl alcohol glycol ether is commercially available as SURFONIC® L24-7 surfactant from Huntsman Petrochemical Co. An example of a suitable demulsifying surfactant comprises a mixture comprising 4 moles of ethoxylated nonylphenol and 9 moles of an ethoxylated nonylphenol that is commercially available as NP-49 surfactant from Dow Chemical, Houston, Tex. Another suitable demulsifying surfactant comprises a quaternized triethanolamine condensate polymer, commercially available as CLEARBREAK RT-33™ surfactant from Chemron Corporation, Paso Robles, Calif. Another example of a suitable demulsifying surfactant comprises a triethanolamine condensate polymer commercially available as CLEARBREAK RT-623™ surfactant also from Chemron Corporation.

Generally, the demulsifying surfactant should be present in the oil-based settable spotting compositions in an amount sufficient to provide the desired demulsification. In some embodiments, the demulsifying surfactant may be present in an amount in an amount in the range of from about 0.3% to about 3% by weight. In some embodiments, the demulsifying surfactant may be present in an amount in an amount in the range of from about 0.3% to about 2.5% by weight.

Optionally, the oil-based settable spotting compositions of the present invention may further comprise a hydraulic cement. Where present, the hydraulic cement should be present in the oil phase of the oil-external emulsion. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, fly ash cements, gypsum cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to the American Petroleum Institute, *API Specification for Materials and Testing for Well Cements*, API Specification 10, Fifth Ed., Jul. 1, 1990.

Where present, the hydraulic cement generally may be included in the settable spotting compositions in an amount sufficient to provide the desired compressive strength, density, and/or cost. In some embodiments, the hydraulic cement may be present in the settable spotting compositions of the present invention in an amount in the range of from 20% to about 80% by weight. In some embodiments, the hydraulic cement may be present in the settable spotting compositions of the present invention in an amount in the range of from about 50% to about 80% by weight. When a mixture of the hydraulic cement and CKD are used, these components may be included in the settable spotting compositions of the present invention in a hydraulic cement-to-CKD weight ratio in the range of from about 80:20 to about 20:80. In some embodiments, this hydraulic cement-to-CKD ratio may be in the range of from about 40:60 to about 60:40.

In some embodiments, a fly ash cement may be used. A fly ash cement that may be suitable for use comprises fly ash. A variety of fly ashes may be suitable, including fly ash classified as Class C and Class F according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a settable spotting composition with water. In some embodiments, lime may be mixed with Class F fly ash in an amount in the range of from about 0.1% to about 25% by weight of the fly ash. In some instances, the lime may be hydrated lime. Suitable examples of fly ash include, but are not limited to, POZMIX® A cement additive from Halliburton Energy Services, Inc., Duncan, Okla.

Where present, the fly ash generally may be included in the settable spotting compositions in an amount sufficient to provide the desired compressive strength, density, and/or cost. In some embodiments, the fly ash may be present in the settable spotting compositions of the present invention in an amount in the range of from about 25% to about 75% by weight. In some embodiments, the fly ash may be present in the settable spotting compositions of the present invention in an amount in the range of from about 40% to about 60% by weight.

Additionally, the oil-based settable spotting compositions of the present invention optionally may comprise shale. Generally, the shale may be included in the oil phase of the oil-external emulsion. Among other things, shale included in the settable spotting compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, PRESSUR-SEAL® Fine LCM and PRESSUR-SEAL® Coarse LCM, which are commercially available from TXI Energy Services, Inc., Houston, Tex. Generally, the shale may have any particle size distribution as desired for a particular application. In certain embodiments, the shale may have a particle size distribution in the range of from about 37 micrometers to about 4,750 micrometers.

Where present, the shale may be included in the settable spotting compositions of the present invention in an amount sufficient to provide the desired compressive strength, density, and/or cost. In some embodiments, the shale may be present in an amount in the range of from about 12.5% to about 37.5% by weight. In some embodiments, the shale may be present in an amount in the range of from about 20% to about 30% by weight. One of ordinary skill in the art, with the benefit of this disclosure, will recognize the appropriate amount of the shale to include for a chosen application. When a mixture of the shale and CKD are used, these components may be included in the settable spotting compositions of the present invention in a shale-to-CKD weight ratio in the range of from about 80:20 to about 20:80. In some embodiments, this shale-to-CKD ratio may be in the range of from about 40:60 to about 60:40.

In some embodiments, the oil-based settable compositions of the present invention may further comprise lime. Generally, the lime may be included in the oil phase of the oil external emulsion. Examples of suitable limes include hydrated lime. In some embodiments, the lime may be present in an amount in the range of from about 5% to about 15% by weight. In some embodiments, the lime may be present in an amount in the range of from about 5% to about 12% by weight.

Optionally, other additional additives may be included in the oil-based settable spotting compositions of the present invention as deemed appropriate by one skilled in the art, with the benefit of this disclosure. Examples of such additives include, but are not limited to, accelerators, weight reducing additives, heavyweight additives, lost circulation materials, filtration control additives, dispersants, and combinations thereof. Suitable examples of these additives include crystalline silica compounds, amorphous silica, salts, fibers, hydratable clays, microspheres, latex cement, thixotropic additives, combinations thereof and the like.

II. Water-Based Embodiments

As previously discussed, in some embodiments, the settable spotting compositions of the present invention may be water-based. In these water-based embodiments, the settable spotting compositions of the present invention may comprise water, CKD, and a set retarding additive. In some embodiments, the settable spotting compositions further may comprise a gel strength inhibitor and/or a fluid loss control additive. The water-based settable spotting compositions of the present invention should set over time to form a hardened mass, but should not for a desired period of time, for example, from about 1 day to at least 2 weeks. Nor should these settable spotting compositions have an undesirable increase in gel strength after being static in the well bore a period of time, for example, up to at least two weeks, so that the settable spotting compositions may be displaced from the well bore.

The water that may be used in the water-based settable spotting compositions of the present invention is described above in the oil-based embodiments. In some embodiments, the water may be present in the settable spotting compositions of the present invention in an amount in the range of from about 40% to about 120% by weight. In some embodiments, the water may be present in the settable spotting compositions of the present invention in an amount in the range of from about 50% to about 100% by weight.

The CKD included in the water-based settable spotting compositions is described above in the oil-based embodiments. The CKD may be included in the settable spotting compositions of the present invention in an amount sufficient to provide the desired compressive strength, density, and/or cost. In some embodiments, the CKD may be present in the settable spotting compositions of the present invention in an amount in the range of from about 0.01% to 100% by weight. In some embodiments, the CKD may be present in the settable spotting compositions of the present invention in an amount in the range of from about 5% to 100% by weight. In some embodiments, the CKD may be present in the settable spotting compositions of the present invention in an amount in the range of from about 5% to about 80% by weight. In some embodiments, the CKD may be present in the settable spotting compositions of the present invention in an amount in the range of from about 10% to about 50% by weight.

The water-based settable spotting compositions further comprise a set retarding additive. Examples of suitable set retarding additives are described above in the oil-based embodiments. The set retarding additive should be included in the settable spotting compositions of the present invention in an amount sufficient to provide the desired set retardation. In some embodiments, the set retarding additive may be present in a settable spotting composition of the present invention in an amount in the range of from about 0.1% to about 5% by weight.

Optionally, the water-based settable spotting compositions of the present invention may further comprise a gel strength inhibitor. As used herein, the term "gel strength inhibitor" refers to an additive that should inhibit the development of gel strength in the settable spotting compositions of the present invention. Suitable gel strength inhibitors include, but are not limited to, copolymers that comprise N,N-dimethylacrylamide and 2-acrylamido-2-methylpropanesulfonic acid. The copolymer may be used in the acid form and/or the salt form. Suitable copolymers also may be useful to reduce fluid loss and are disclosed in more detail in U.S. Pat. No. 4,555,269, the entire disclosure of which is incorporate herein by reference. An example of a suitable gel strength inhibitor is HALAD® 344 cement additive, from Halliburton Energy Services, Inc., Duncan, Okla. In some embodiments, the gel strength inhibitor used may be present in a settable spotting composition of the present invention in an amount in the range of from about 0.1% to about 2% by weight. In some embodiments, the gel strength inhibitor may be present in an amount in the range of from about 0.4% to about 0.75% by weight.

Optionally, the water-based settable spotting compositions of the present invention may further comprise a hydraulic cement. Hydraulic cements that may be included in the water-based settable spotting compositions of the present invention are described above in the oil-based embodiments. Where present, the hydraulic cement generally may be included in the settable spotting compositions in an amount sufficient to provide the desired compressive strength, density, and/or cost. In some embodiments, the hydraulic cement may be present in the settable spotting compositions of the present invention in an amount in the range of from 30% to about 90% by weight. In some embodiments, the hydraulic cement may be present in the settable spotting compositions of the present invention in an amount in the range of from about 30% to about 80% by weight. When a mixture of the hydraulic cement and CKD are used, these components may be included in the settable spotting compositions of the present invention in a hydraulic cement-to-CKD weight ratio in the range of from about 80:20 to about 20:80. In some embodiments, this hydraulic cement-to-CKD ratio may be in the range of from about 40:60 to about 60:40.

In some embodiments, a fly ash cement that may be suitable for use comprises fly ash. Fly ash cements that may be included in the water-based settable spotting compositions of the present invention are described above. Where present, the fly ash generally may be included in the settable spotting compositions in an amount sufficient to provide the desired compressive strength, density, and/or cost. In some embodiments, the fly ash may be present in the settable spotting compositions of the present invention in an amount in the range of from about 30% to about 70% by weight. In some embodiments, the fly ash may be present in the settable spotting compositions of the present invention in an amount in the range of from about 30% to about 60% by weight.

Optionally, the water-based settable spotting compositions of the present invention may further comprise shale. The shale that may be included in the water-based embodiments is described above in the oil-based embodiments. The shale may be included in the settable spotting compositions of the present invention in an amount sufficient to provide the desired compressive strength, density, and/or cost. In some embodiments, the shale may be present in an amount in the range of from about 5% to about 30% by weight. In some embodiments, the shale may be present in an amount in the range of from about 5% to about 25% by weight. One of ordinary skill in the art, with the benefit of this disclosure, will recognize the appropriate amount of the shale to include for a chosen application. When a mixture of the shale and CKD are used, these components may be included in the settable spotting compositions of the present invention in a shale-to-CKD weight ratio in the range of from about 80:20 to about 20:80. In some embodiments, this shale-to-CKD ratio may be in the range of from about 40:60 to about 60:40.

The lime that may be included in the water-based settable compositions is described above in the oil-based embodiments. In some embodiments, the lime may be present in an amount in the range of from about 5% to about 15% by weight. In some embodiments, the lime may be present in an amount in the range of from about 5% to about 12% by weight.

Optionally, the water-based settable spotting compositions of the present invention may further comprise a fluid loss control additive. A variety of fluid loss control additives suitable for use in cement compositions may be used in the settable spotting compositions of the present invention. An example of a suitable fluid loss control additive comprises a graft polymer containing a backbone that comprises a lignin, lignite, humic acid, or salts thereof, and grafted groups that comprise 2-acrylamido-2-methylpropanesulfonic acid, acrylonitrile, N,N-dimethylacrylamide, salts thereof, and combinations thereof. The above described fluid loss additives are described in U.S. Pat. No. 4,676,317, the entire disclosure of which is incorporated herein by reference. Another suitable fluid loss control additive comprises a random polymerization product of at least two different vinyl containing monomers including a vinyl amide morpholine derivative. Such a fluid loss control additive is described in U.S. Pat. No. 5,988,279, the entire disclosure of which is incorporated herein by reference. Where used, the fluid loss control additive may be present in an amount in the range of from about 0.1% to about 2% by weight. In some embodiments, the fluid loss control additive may be present in an amount in the range of from about 0.4% to about 0.75% by weight.

Optionally, the water-based settable spotting compositions of the present invention may further comprise a free water control additive. Among other things, the free water control additive may be included to reduce (or prevent) the presence of free water in the settable spotting compositions of the present invention. Examples of suitable free water control additives include, but are not limited to, bentonite, amorphous silica, hydroxyethyl cellulose, and combinations thereof. Where used, the free water control additive may be present in an amount in the range of from about 1% to about 5% by weight.

Optionally, other additional additives may be included in the water-based settable spotting compositions of the present invention as deemed appropriate by one skilled in the art, with the benefit of this disclosure. Examples of such additives include, but are not limited to, accelerators, weight reducing additives, heavyweight additives, lost circulation materials, filtration control additives, dispersants, and combinations thereof. Suitable examples of these additives include crystalline silica compounds, amorphous silica, salts, fibers, hydratable clays, microspheres, latex cement, thixotropic additives, combinations thereof and the like.

III. Example Methods of the Present Invention

In some embodiments, the settable spotting compositions of the present invention may be used as a displacement fluid. An example method of the present invention may comprise providing a settable spotting composition of the present invention comprising CKD, introducing the settable spotting composition into a well bore so as to displace at least a portion of a second fluid from the well bore. In certain embodiments, the second fluid may a drilling fluid. For example, the settable spotting compositions may be used to displace a drilling fluid from the well bore before the drilling fluid has undesirably increased in gel strength. It may be desirable, in some embodiments, for the settable spotting compositions of the present of invention to displace the drilling fluid from those portions of the well bore containing fractures, vugs, and other permeable portions of the well bore. In some embodiments, an oil-based settable spotting composition of the present invention may be used to displace an oil-based drilling fluid, and a water-based settable spotting composition of the present invention may be used to displace a water-based drilling fluid.

Additional steps in the methods of the present invention may include, but are not limited to, introducing a pipe string into the well bore, and introducing a cement composition into the well bore so as to displace at least a portion of the settable spotting composition from the well bore. Portions of the settable spotting composition may remain in the well bore, for example, in fractures or other permeable portions of the subterranean formation. Those of ordinary skill in the art will appreciate that the cement composition also may displace any remaining drilling fluid from the well bore.

After introduction therein, the cement composition should be allowed to set in the well bore. Also, any of the settable spotting composition of the present invention remaining in the well bore (e.g., in permeable portions of the formation) should be allowed to set. For the oil-based embodiments, in some embodiments, contact with the water in the cement composition should facilitate breaking of the oil external emulsion. Once the oil-external emulsion breaks, the CKD should mix with water present in the settable spotting composition.

To facilitate a better understanding of the present invention, the following examples of certain aspects of some embodiments are given. In no way should the following examples be read to limit, or define, the scope of the invention.

Example 1

Sample oil-based settable spotting compositions of the present invention were prepared at room temperature in accordance with the following procedure. A long chain mineral oil (ESCAID™ 110 oil from Exxon, Houston, Tex.) in an amount of 105 grams was mixed with 9.7 grams of an emulsifying surfactant (a tallow diamine substituted with 3 moles of ethylene oxide from Champion Chemicals, Houston, Tex.) and 2.1 grams of an oil dispersible organophilic clay (CLAYTONE® II additive from Southern Clay Company, Houston, Tex.). The mixture was mixed to obtain a uniform dispersion of the surfactants in the mineral oil. Next, 131 grams of water were added to the mixture, and the resulting mixture was mixed until an oil external emulsion was formed. To this oil external emulsion, 141 grams of Class H Portland cement and 141 grams of Class H CKD were added, and the resulting mixture was mixed to obtain a uniform mixture of the components. As indicated in the table below, varying amounts of a set retarding additive were also included in the sample compositions.

Once prepared, the sample compositions were heated in a water bath to 140° F. and subjected to gel strength testing in accordance Appendix A, API RP 13B-2, 2d edition, Dec. 1, 1991, and compressive strength tests in accordance with API Specification 10. The results of these tests are provided in the table below.

TABLE 1

Oil-Based Compressive Strength Tests

| Sample | Cement-CKD Ratio | Retarder Type | % by wt | Fluid Time (Days) | Set Time[3] (Days) | Compressive Strength (psi) |
|---|---|---|---|---|---|---|
| Sample No. 1 | 50:50 | HR® -5 Retarder | 0.3 | — | <1 | 31 (3 day) |
| Sample No. 2 | 50:50 | HR® -5 Retarder | 0.5 | 1 | 2 | 25 (3 day) |
| Sample No. 3 | 50:50 | HR® -5 Retarder | 0.7 | 1 | 2 | 22 (3 day) |
| Sample No. 4 | 50:50 | SCR® -100 Retarder | 0.3 | — | <1 | 24 (4 day) |
| Sample No. 5 | 50:50 | SCR® -100 Retarder | 0.6 | 1 | 2–3 | 21 (4 day) |
| Sample No. 6 | 50:50 | SCR® -100 Retarder | 1.0 | 1 | 2–3 | 15 (4 day) |
| Sample No. 7 | 50:50 | MMCR[1] | 0.25[2] | 4 | 7 | 40 psi (8 day) |
| Sample No. 8 | 50:50 | MMCR | 0.50[2] | 7 | 8 | 75 psi (10 day)[4] |
| Sample No. 9 | 50:50 | MMCR | 1.0[2] | 7 | 8 | 20 psi (10 day)[5] |

[1]MMCR is a phosphonic acid derivative from Monsanto, St. Louis, Missouri.
[2]The amount of MMCR included in the sample compositions is in gallons per barrel of the sample composition.
[3]The sample composition is not fluid after the time indicated as "Set Time."
[4]Sample No. 8 had a shear strength of 350 lbs/100 ft²
[5]Sample No. 9 had a shear strength of 350 lbs/100 ft²

Example 2

Sample water-based settable spotting compositions of the present invention were prepared at room temperature that comprised 45% by weight PRESSUR-SEAL® Fine LCM, 45% by weight Class H CKD, 10% by weight hydrated lime, 0.15% by weight of a free water control additive (hydroxyethyl celluose from Dow Chemical, Houston, Tex.), and 95.29% by weight of water. As indicated in the table below, SCR®-100 retarder was also included in the sample compositions in varying amounts. The water-based sample compositions had a density of 12.26 pounds per gallon.

Once prepared, the sample compositions were heated in a water bath to the indicated test temperature and subjected to gel strength testing in accordance with Appendix A, API RP 13B-2, 2d edition, Dec. 1, 1991, compressive strength tests in accordance with API Specification 10, and/or shear strength tests utilizing a Shearometer from Baroid Drilling Fluids, Houston, Tex.

The results of these tests are provided in the table below.

TABLE 2

| Sample | Shale-CKD Ratio | Retarder (% by wt) | Test Temp. (° F.) | Fluid Time (Days) | Set Time[1] (Days) | Compressive Strength (psi) | Shear Strength (lbs/100 ft²)[2] |
|---|---|---|---|---|---|---|---|
| Sample No. 10 | 50:50 | 1.0 | 140 | 1 | not set | — | 100 |
| Sample No. 10 | 50:50 | 1.0 | 140 | 2–3 | not set | 136 (4 day) | — |
| Sample No. 11 | 50:50 | 1.0 | 160 | 1 | not set | — | 80 |
| Sample No. 11 | 50:50 | 1.0 | 160 | 1 | 2–3 | 492 (4 day) | — |
| Sample No. 12 | 50:50 | 2.0 | 140 | 5 | not set | — | 100 |

TABLE 2-continued

| Sample | Shale-CKD Ratio | Retarder (% by wt) | Test Temp. (° F.) | Fluid Time (Days) | Set Time[1] (Days) | Compressive Strength (psi) | Shear Strength (lbs/100 ft²)[2] |
|---|---|---|---|---|---|---|---|
| Sample No. 12 | 50:50 | 2.0 | 140 | 5 | 6 | — | 300 |
| Sample No. 12 | 50:50 | 2.0 | 140 | 12 | 13 | 1,157 (14 day) | — |
| Sample No. 13 | 50:50 | 2.0 | 160 | 5 | not set | — | 170 |
| Sample No. 13 | 50:50 | 2.0 | 160 | 5 | 6 | — | 600 |
| Sample No. 13 | 50:50 | 2.0 | 160 | 12 | 13 | 760 (14 day) | — |

[1]The sample composition is not fluid after the time indicated as "Set Time."
[2]A sample composition having a shear strength of below 250 lbs/100 ft² is fluid.

Accordingly, the above examples indicated that oil-based and water-based settable spotting compositions of the present invention may be suitable for use in particular application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A settable spotting composition comprising:
water;
cement kiln dust; and
a set retarding additive;
wherein the settable spotting composition has a four day compressive strength of less than or equal to about 492 pounds per square inch at a temperature in the range of from about 140° F. to about 160° F.

2. The composition of claim 1 wherein the settable spotting composition further comprises a fly ash.

3. The composition of claim 2 wherein the fly ash cement further comprises hydrated lime.

4. The composition of claim 1, wherein the settable spotting composition comprising an oil external emulsion, the oil external emulsion comprising oil, the water, the cement kiln dust, the set retarding additive, an emulsifying surfactant, and the set retarding additive.

5. The composition of claim 4 wherein the cement kiln dust is present in the oil phase of the oil external emulsion.

6. The composition of claim 4 wherein the cement kiln dust is present in the settable spotting composition in an amount in the range of from about 5% to about 80% by weight.

7. The composition of claim 4 wherein the set retarding additive comprises at least one retarder selected from the group consisting of: ammonium; an alkali metal; an alkaline earth metal; a metal salt of a sulfoalkylated lignin; a water-soluble hydroxycarboxyacid; a synthetic copolymer; a phosphonic acid derivative; a boric acid derivative; and combinations thereof.

8. The composition of claim 4 wherein the emulsifying surfactant comprises at least one surfactant selected from the group consisting of: a tall oil diethanolamide; a mixture of oxidized tall oil fatty acids; an alklylphenol hydroxypolyoxyethylene; and combinations thereof.

9. The composition of claim 4 wherein the oil external emulsion further comprises at least one additive selected from the group consisting of: a hydraulic cement; a demulsifying surfactant; a shale; lime; and combinations thereof.

10. The composition of claim 4 wherein the oil external emulsion further comprises a fly ash.

11. The composition of claim 4 wherein the oil external emulsion comprises a hydraulic cement in a cement kiln dust to hydraulic cement weight ratio in the range of from about 80:20 to about 20:80.

12. The composition of claim 4 wherein the oil external emulsion further comprises shale in a cement kiln dust to shale weight ratio in the range of from about 80:20 to about 20:80.

13. The composition of claim 4 wherein the oil external emulsion comprises a demulsifying surfactant selected from the group consisting of: an ethoxylated nonylphenol; a quarternized triethanolamine condensate polymer; a triethanolamine condensate polymer; an ethoxylated alkyl alcohol glycol ether; and combinations thereof.

14. The composition of claim 1 wherein the cement kiln dust is present in the settable spotting composition in an amount in the range of from about 5% to about 80% by weight.

15. The composition of claim 1 wherein the set retarding additive comprises at least one retarder selected from the group consisting of: ammonium an alkali metal; an alkaline earth metal; a metal salt of a sulfoalkylated lignin; a water-soluble hydroxycarboxyacid; a synthetic copolymer; a phosphonic acid derivative; a boric acid derivative; and combinations thereof.

16. The composition of claim 1 wherein the settable spotting composition further comprises at least additive elected from the group consisting of: a gel strength inhibitor; a fluid loss control additive; a hydraulic cement; a shale; a lime; a free water control additive; and combinations thereof.

17. The composition of claim 1 wherein the settable spotting composition further comprises a gel strength inhibitor comprising a copolymer of N,N-dimethylacrylamide and 2-acrylamido-2-methylpropanesulfonic acid.

18. The composition of claim 1 wherein the settable spotting composition further comprises a fluid loss control additive comprising a graft polymer containing a backbone comprising at least one member selected from the group consisting of a lignin, a lignite, humic acid, and salts thereof, and grafted groups that comprise at least one member selected from the group consisting of 2-acrylamido-2-methylpropanesulfonic acid, acrylonitrile, N,N-dimethylacrylamide, and salts thereof, and combinations thereof.

19. The composition of claim 1 wherein the settable spotting composition further comprises a hydraulic cement in a cement kiln dust to hydraulic cement weight ratio in the range of from about 80:20 to about 20:80.

20. The composition of claim 1 wherein the settable spotting composition further comprises shale in a cement kiln dust to shale weight ratio in the range of from about 80:20 to about 20:80.

21. The composition of claim 1 wherein the settable spotting composition further comprises a free water control additive selected from the following group consisting of: bentonite; amorphous silica; hydroxyethyl cellulose; and combinations thereof.

22. The composition of claim 1 wherein the settable spotting composition comprises a hydraulic cement in a hydraulic cement to cement kiln dust ratio in the range of from about 40:60 to about 60:40.

23. The composition of claim 1 wherein the settable spotting composition comprises a gel strength inhibitor in an amount in the range of from about 0.1% to about 2% by weight.

24. A settable spotting composition comprising water, cement kiln dust, a set retarding additive, a gel strength inhibitor, a fluid loss control additive, and shale in a shale to cement kiln dust weight ratio in the range of from about 80:20 to about 20:80, wherein the settable spotting composition has a four day compressive strength of less than or equal to about 492 pounds per square inch at a temperature in the range of from about 140° F. to about 160° F.

25. A settable spotting composition comprising water, cement kiln dust, a set retarding additive, a gel strength inhibitor, a fluid loss control additive, and a hydraulic cement in a hydraulic cement to cement kiln dust weight ratio in the range of from about 80:20 to about 20:80, wherein the settable spotting composition has a four day compressive strength of less than or equal to about 492 pounds per square inch at a temperature in the range of from about 140° F. to about 160° F.

* * * * *